US012392179B2

(12) United States Patent
Yang et al.

(10) Patent No.: US 12,392,179 B2
(45) Date of Patent: Aug. 19, 2025

(54) TELESCOPIC DOOR STOP DEVICE

(71) Applicants: Hao-Wei Yang, Changhua (TW); Tzu-Yi Yang, Changhua (TW)

(72) Inventors: Hao-Wei Yang, Changhua (TW); Tzu-Yi Yang, Changhua (TW)

( * ) Notice: Subject to any disclaimer, the term of this patent is extended or adjusted under 35 U.S.C. 154(b) by 102 days.

(21) Appl. No.: 18/389,794

(22) Filed: Dec. 20, 2023

(65) Prior Publication Data

US 2025/0207442 A1 Jun. 26, 2025

(51) Int. Cl.
*E05C 19/00* (2006.01)

(52) U.S. Cl.
CPC .................................. *E05C 19/004* (2013.01)

(58) Field of Classification Search
CPC ..................................................... E05C 19/004
See application file for complete search history.

(56) References Cited

U.S. PATENT DOCUMENTS 4,300,796 A * 11/1981 Lane ..................... E05C 19/004 292/339
4,438,640 A * 3/1984 Willis ................... E05C 19/004 292/339
4,456,291 A * 6/1984 Brogie .................. E05C 19/004 292/338
4,971,374 A * 11/1990 Lovell ..................... E05C 21/00 292/288
5,340,175 A * 8/1994 Wood .................... E05C 19/004 292/339
5,392,026 A * 2/1995 Marik .................... G08B 13/08 340/546
5,544,386 A * 8/1996 Cobb .................... E05C 19/004 292/288
5,951,071 A * 9/1999 Elliott .................. E05C 19/004 292/262
6,557,915 B1 * 5/2003 Duff ........................ E05C 17/54 292/343
2007/0246954 A1 * 10/2007 Ollinger .................. E05C 17/54 292/338
2016/0186470 A1 * 6/2016 Finley ................... E05C 19/182 292/339
2022/0034131 A1 * 2/2022 Yang ....................... E05B 45/06
2023/0184013 A1 * 6/2023 Yang ....................... E05B 45/06 292/338

* cited by examiner

*Primary Examiner* — Mark A Williams

(57) ABSTRACT

A telescopic door stop device includes a tube assembly with a first tube and a second tube. A connecting tube assembly includes a first connecting member and a second connecting member respectively connected to first and second tubes. The first connecting member is detachably connected to the second connecting member. The first connecting member has an engaging part which is connected to an engaging groove of the second connecting member. Two rotational grooves respectively extend from the engaging groove. When the engaging part is inserted into the engaging groove and rotated into the rotational grooves, the first connecting member and the second connecting member are mutually locked to connect the first tube to the second tube. A stop assembly includes a door stop element and a door supporting element respectively connected to two ends of the tube assembly.

10 Claims, 10 Drawing Sheets

TELESCOPIC DOOR STOP DEVICE

FIELD OF THE INVENTION

The present invention relates to a security device, and more particularly, to a telescopic door stop device.

BACKGROUND OF THE INVENTION

In recent years, there has been an increasing number of home burglaries, leading to the development of various forms of door security device. The most common anti-theft device involves using a door barricade placed below the doorknob inside the house. Existing door barricades generally consist of a rod, a blocking component, and a support component. The blocking component is positioned to block against the doorknob, while the support component braces against the floor, causing the rod to support at a slight angle between the door and the floor. This prevents the doorknob from being turned, thereby thwarting intruders from unlocking the door from the outside.

The present invention intends to provide a telescopic door stop device to eliminate the shortcomings mentioned above.

SUMMARY OF THE INVENTION

The present invention relates to a telescopic door stop device with a rotary connection, and comprises a tube assembly with mutually detachable first tube and second tube. A connecting tube assembly includes a first connecting member connected to the first tube, and a second connecting member connected to the second tube. The first connecting member is detachably connected to the second connecting member. The first connecting member has an engaging part, and the second connecting member has an engaging groove. Two rotational grooves respectively extend from the engaging groove. When the engaging part is inserted into the engaging groove and rotated into the rotational grooves, the first connecting member and the second connecting member are mutually locked in a non-rotatable position to connect the first tube to the second tube. A stop assembly includes a first portion and a second portion respectively inserted into the first tube and the second tube. The first portion includes a door stop element, and the second portion includes a door supporting element.

The primary object of the present invention is to provide a telescopic door stop device which is able to be assembled and disassembled by a rotation operation so as to adjust a length of the telescopic stop device, and also is convenience for storage.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
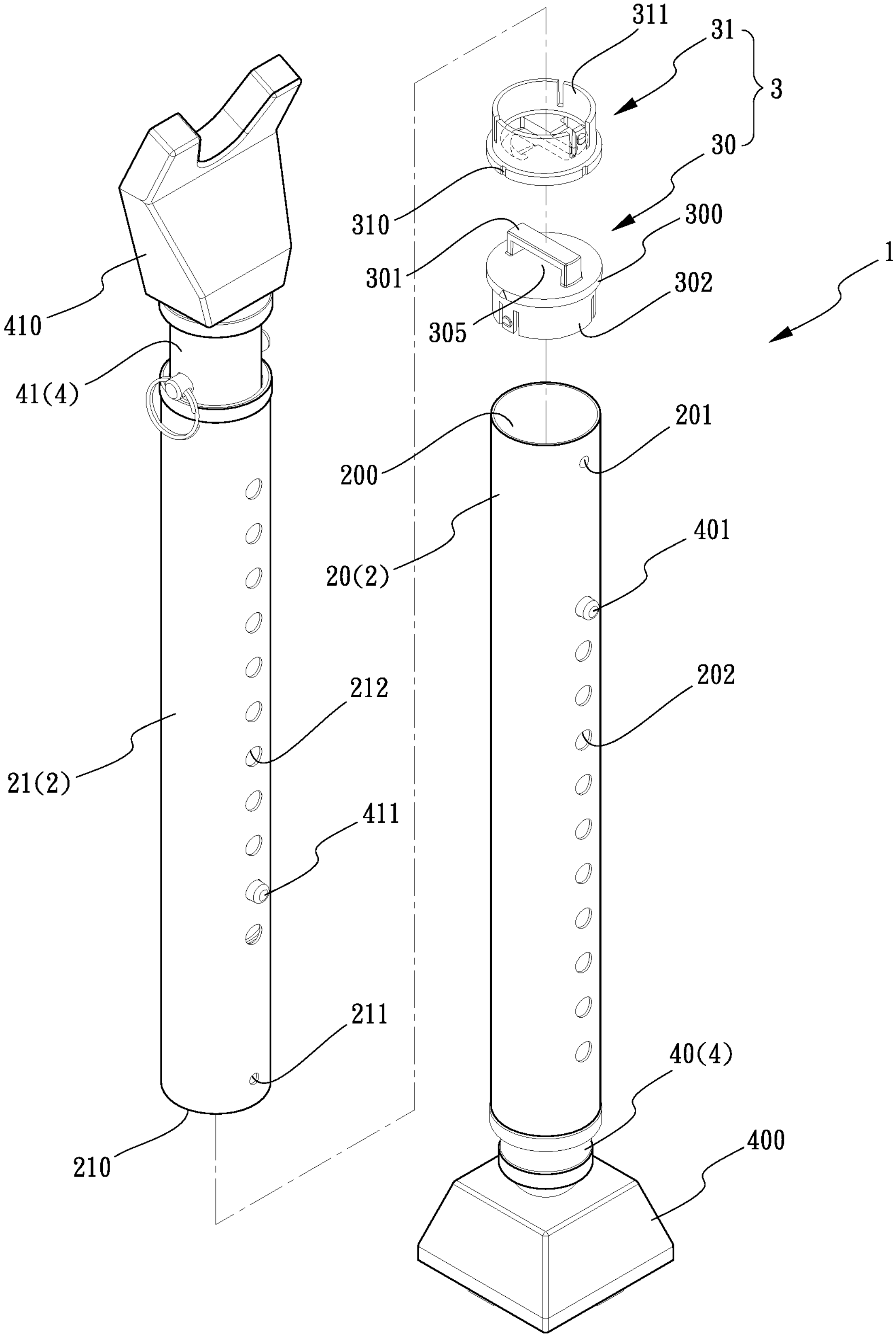
FIG. 1 is an exploded view to show the telescopic door stop device of the present invention.
Figure 2:
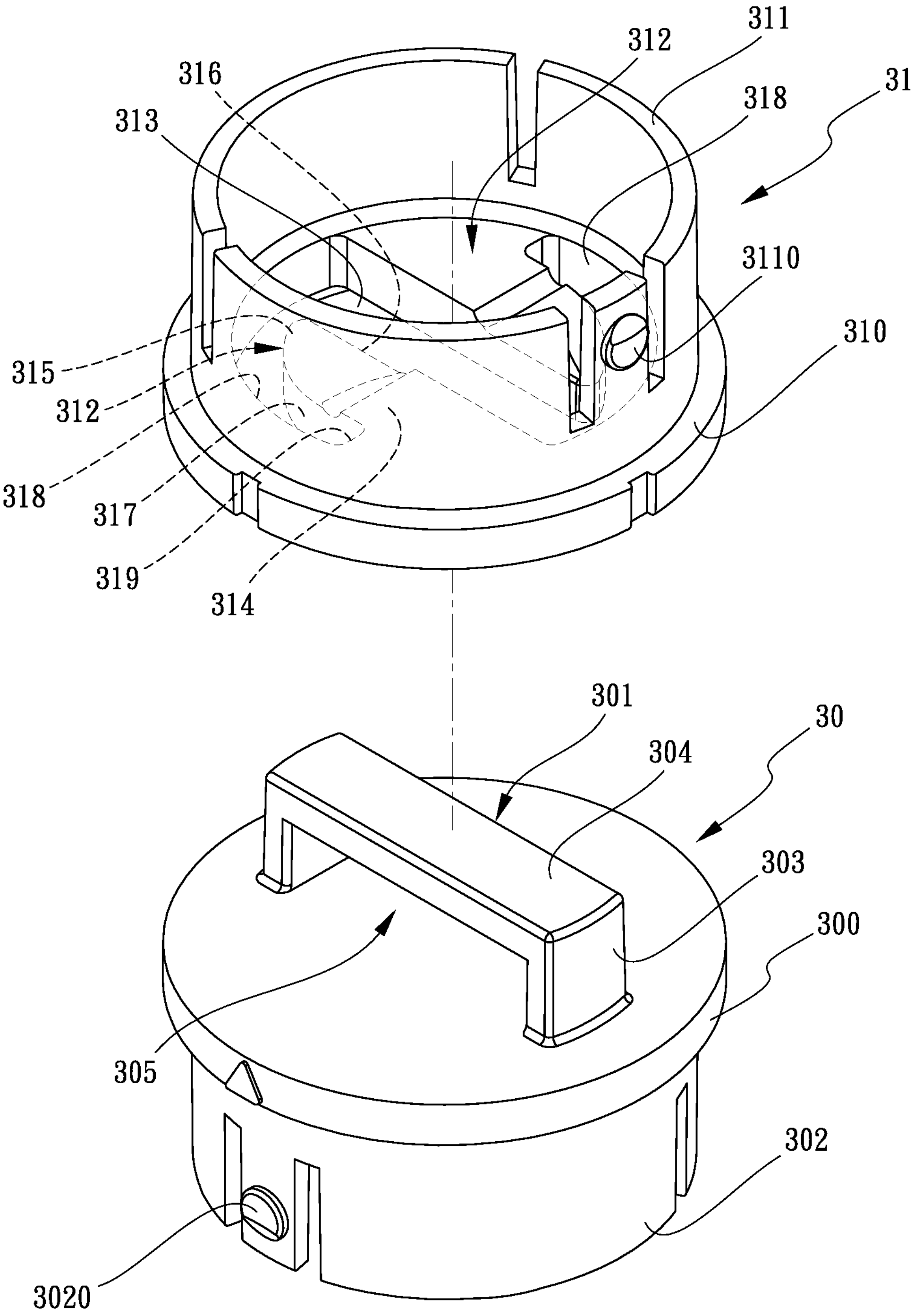
FIG. 2 shows the connecting tube assembly of the telescopic door stop device of the present invention.
Figure 3:
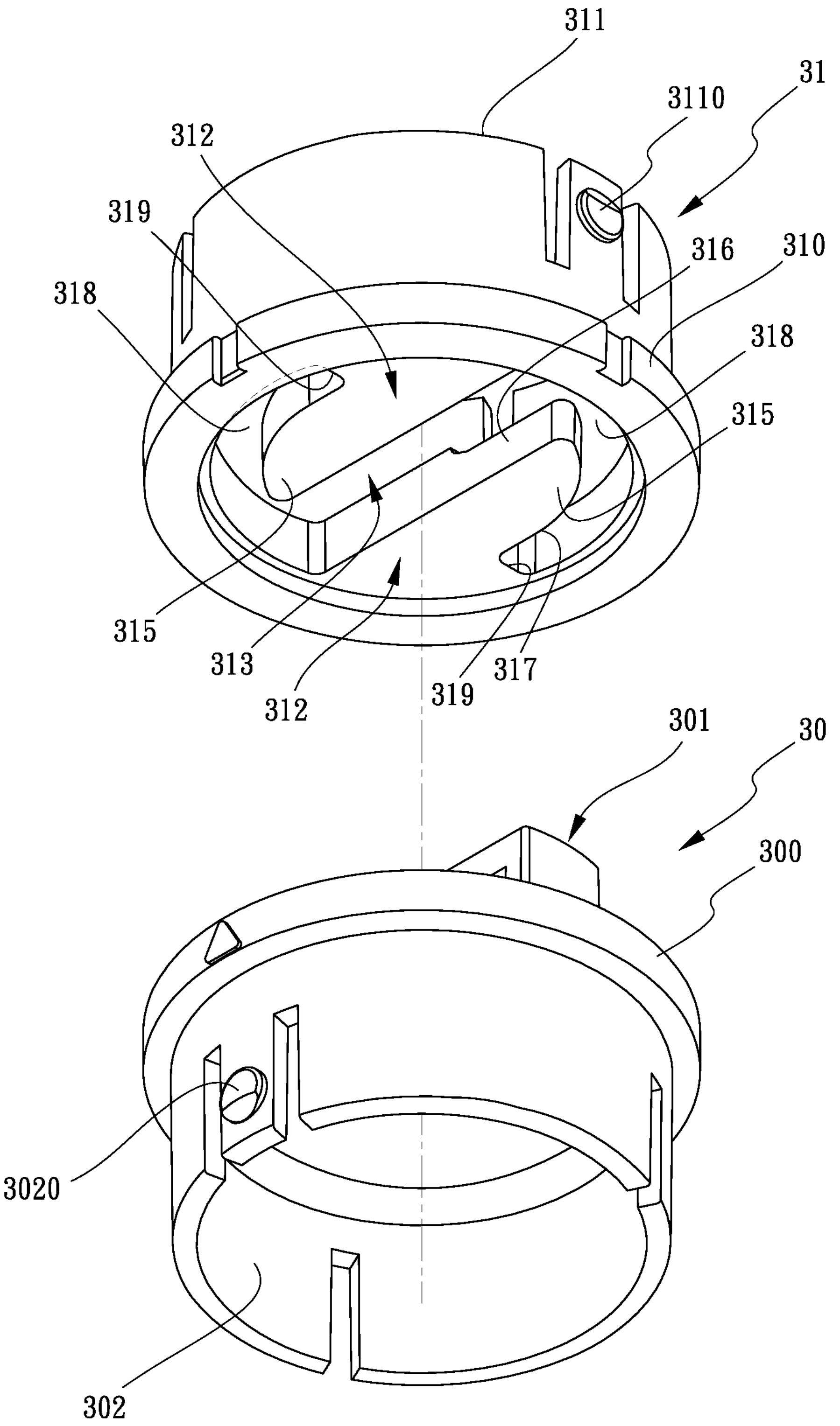
FIG. 3 shows the connecting tube assembly from another angle.
Figure 4:
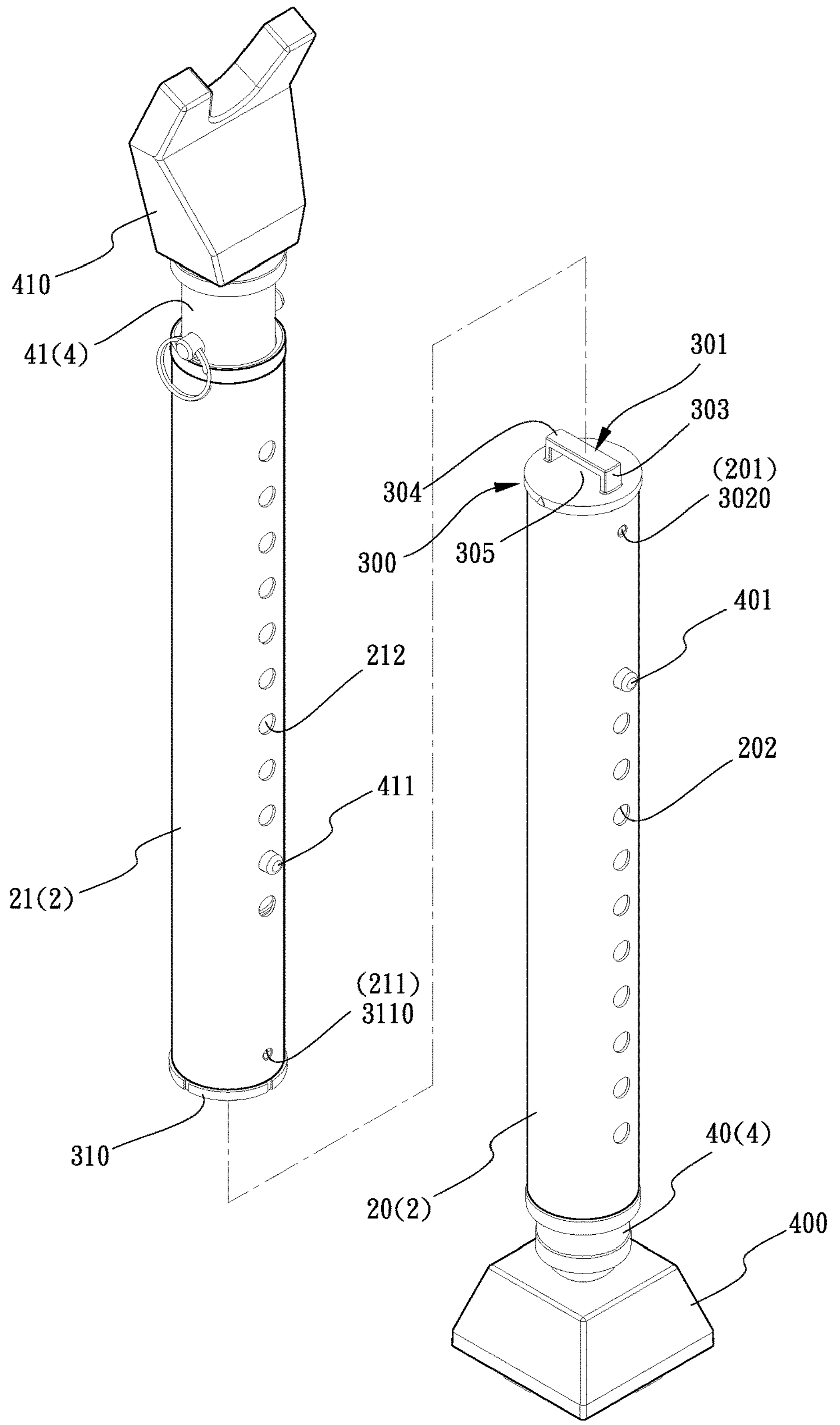
FIG. 4 is another exploded view of the telescopic door stop device of the present invention.
Figure 5:
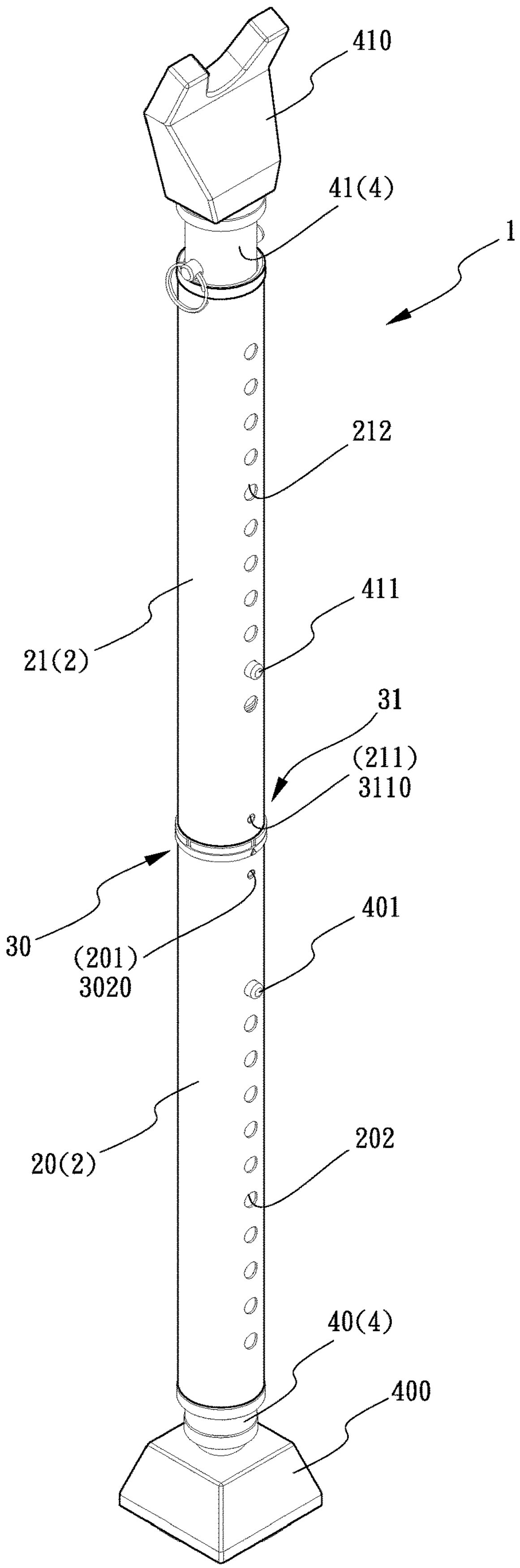
FIG. 5 is a perspective view to show the telescopic door stop device of the present invention.

Referring to FIGS. 1-12, the telescopic door stop device 1 with a rotary connection of the present invention comprises a tube assembly 2 with mutually detachable first tube 20 and second tube 21. The first tube 20 and the second tube 21 each have corresponding first opening 200 and second opening 210 defined through a wall thereof. Furthermore, the first tube 20 includes a first fixing hole 201 located close to the first opening 200, and the second tube 21 includes a second fixing hole 211 located close to the second opening 210. The first tube 20 and the second tube 21 have multiple positioning holes 202, 212 respectively.

A connecting tube assembly 3 includes a first connecting member 30 detachably connected to the first tube 20, and a second connecting member 31 detachably connected to the second tube 21. The first connecting member 30 has an engaging part 301. The first connecting member 30 has a first base 300. The engaging part 301 and a first tubular part 302 are positioned on two opposite sides of the first base 300 of the first connecting member 30. The first tubular part 302 extends from the first base 300 and is inserted into the first opening 200 so that the first base 300 is abutted against the first opening 200 of the first tube 20, and the engaging part 301 is exposed beyond the first tube 20. The first tubular part 302 includes a first protrusion 3020 protruding outward therefrom. The first protrusion 3020 is inserted into the first fixing hole 201 to connect the first connecting member 30 to the first tube 20. The engaging part 301 of the first connecting member 30 is U-shaped part on the first base 300. The engaging part 301 includes two first segments 303 and a second segments 304 connecting between the two first segments 303. A space 305 is formed between the engaging part 301 and the first base 300.

The second connecting member 31 has a second base 310. The second connecting member 31 has a second tubular part 311 extending from an upper side of the second base 310 and inserted into the second opening 210 such that the second base 310 is abutted against the second opening 210 of the second tube 21. The second tubular part 311 includes a second protrusion 3110 protruding outward therefrom. The second protrusion 3110 is inserted into second fixing hole 211 to connect the second connecting member 31 to the second tube 21. The second connecting member 31 has an engaging groove 313 defined in the second base 310, and two rotational grooves 318 respectively extending from the engaging groove 313. When the second tubular part 311 of the second base 310 and inserted into the second opening 210, the engaging groove 313 together with the two rotational grooves 318 are exposed to the engaging part 301. Specifically, the second base 310 has two plates 312, and the engaging groove 313 is formed between the two plates 312. Each of the plates 312 includes a stepped first stop portion 314 and a second stop portion 315. The thickness of the second stop portion 315 is less than that of the stepped first stop portion 314. The second stop portion 315 has a linear end surface 316 and a curved end surface 317 corresponding to the rotational groove 318. The rotational groove 318 forms a closed end 319 at its end, and the rotational groove 318 communicates with the engaging groove 313.

A stop assembly 4 includes a first portion and a second portion respectively inserted into the first tube 20 and the second tube 21. The first portion includes a door stop element 410, and the second portion includes a door supporting element 400 as shown in FIG. 1. The door supporting element 400 is connected to a first rod 40 which is inserted into the first tube 20 and located opposite to the first connecting member 30. The door stop element 410 is connected to a second rod 41 which is inserted into the second tube 21 and located opposite to the second connecting member 31. The first rod 40 includes a first positioning part 401 which extends one of the positioning holes 202 of the first tube 20. The second rod 41 includes a second positioning part 411 which extends one of the positioning holes 212 of the second tube 21 as shown in FIG. 1.

Figure 6:
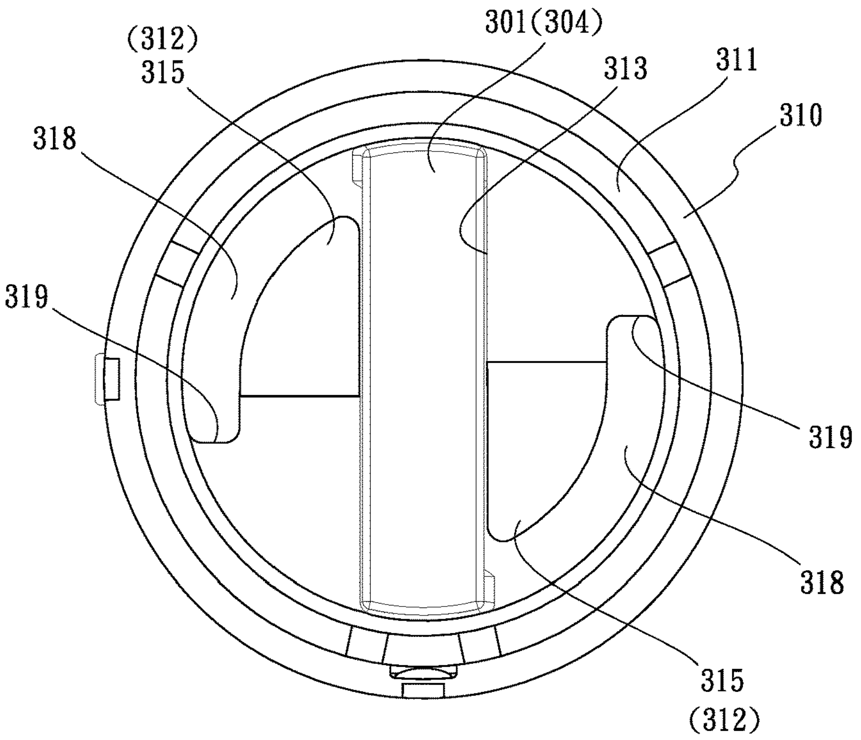
FIG. 6 shows that the engaging part of the first connecting member is located in the engaging groove of the second connecting member, wherein the first connecting member has not rotated relative to the second connecting member.
Figure 7:
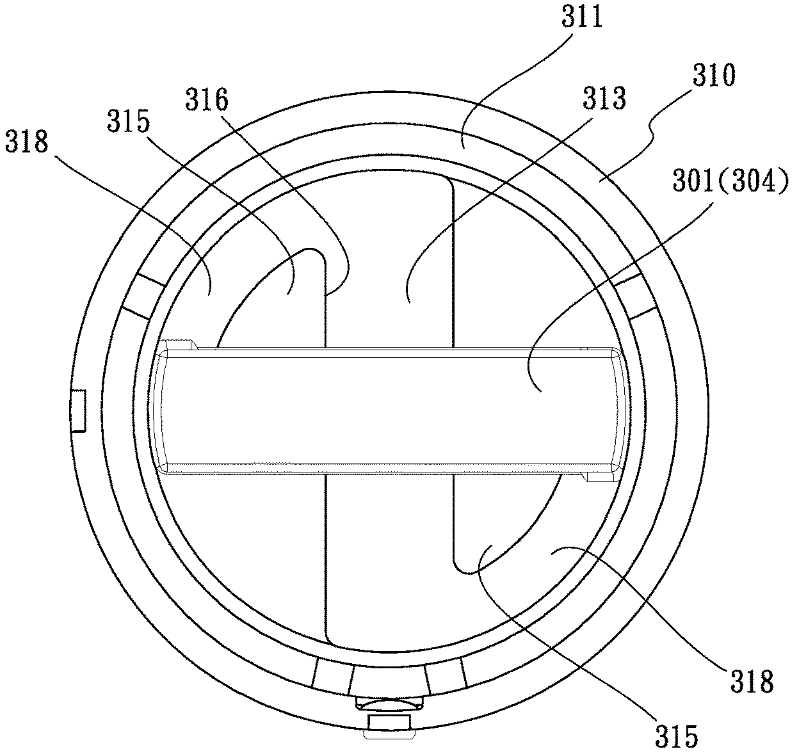
FIG. 7 shows that the engaging part of the first connecting member is rotated to connect the first connecting member to the second connecting member.

The first connecting member 30 is connected to the second connecting member 31 so that the first base 300 and the second base 310 are in close contact. The engaging part 301 of the first connecting member 30 is inserted into the engaging groove 313 of the second connecting member 31 (as shown in FIG. 6). Subsequently, rotate the first tube 20 and the second tube 21 simultaneously in opposite directions (in this embodiment, the first tube 20 rotates clockwise while the second tube 21 rotates counterclockwise). When the engaging part 301 of the first connecting member 30 engages with the engaging groove 313 of the second connecting member 31 via the rotational space 305, and rotates into the position in the rotational groove 318 (as shown in FIG. 7), the inner surface of the second segment 304 of the engaging part 301 tightly locks against the upper side of the second stop portion 315 of the plate 312. This establishes a positional relationship between the first connecting member 30 and the second connecting member 31, completing the assembly of the first tube 20 and the second tube 21. In this embodiment, the first connecting member 30 and the second connecting member 31 can be either a jointed structure or an integral structure with the first tube 20 and the second tube 21.

Figure 8:
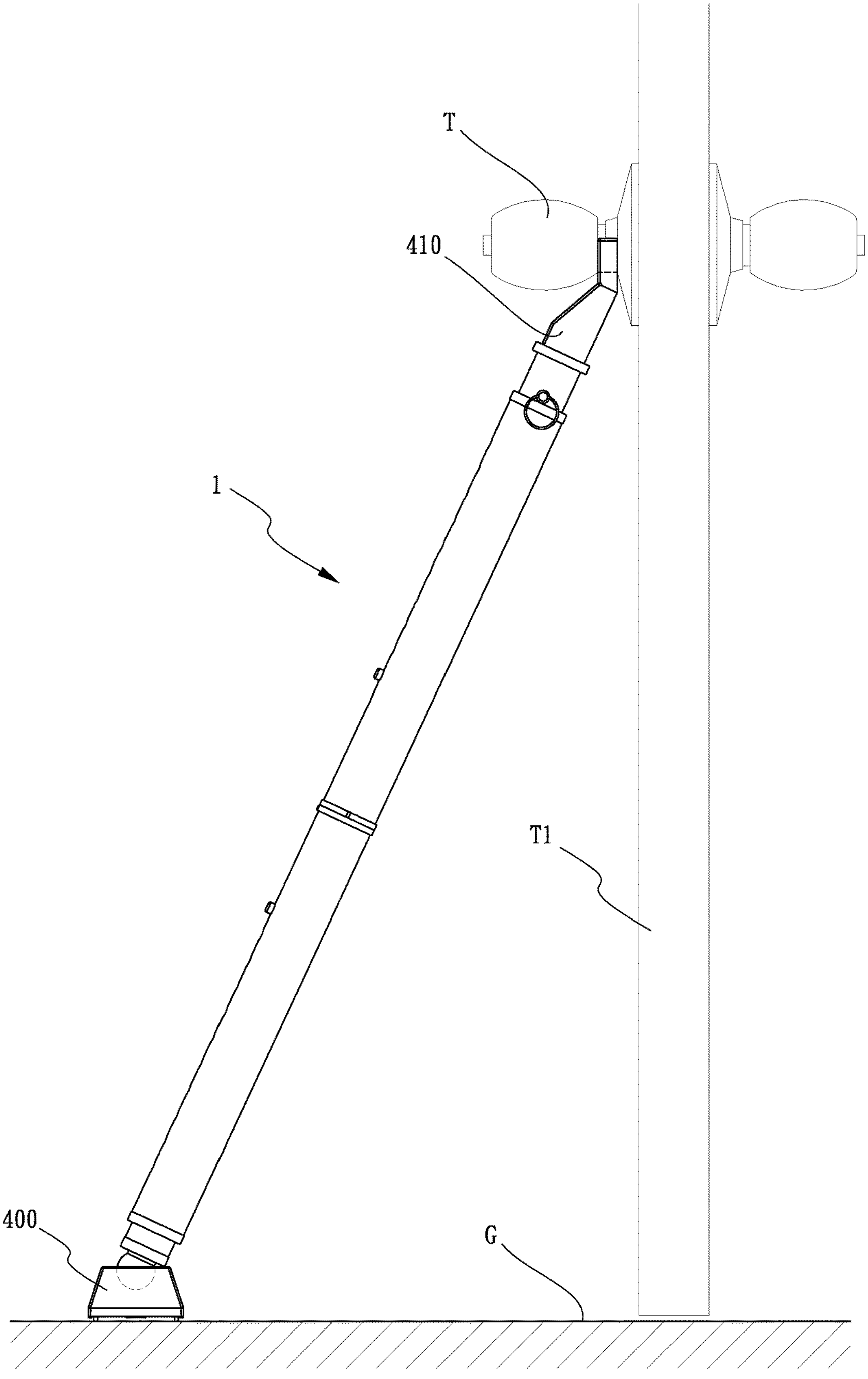
FIG. 8 illustrates the use of the telescopic door stop device of the present invention.

When adjusting the length of the door stop device 1, press the first and second positioning parts 401, 411 of the first rod 40 and the second rod 41 to release them from the positioning relationship with the positioning holes 202, 212. This allows the first rod 40 and the second rod 41 to move relative to the first tube 20 and the second tube 21. In other words, by positioning the first and second positioning parts 401, 411 in different locations of the first and second positioning holes 202, 212, the length of the first rod 40 and the second rod 41 can be adjusted. Once the desired length is achieved, the door supporting element 400 of the first rod 40 can be braced against the ground "G", while the door stop element 410 of the second rod 41 can be braced against the door handle "T" (as shown in FIG. 8), thereby preventing thieves from opening the door from the outside.

Figure 9:
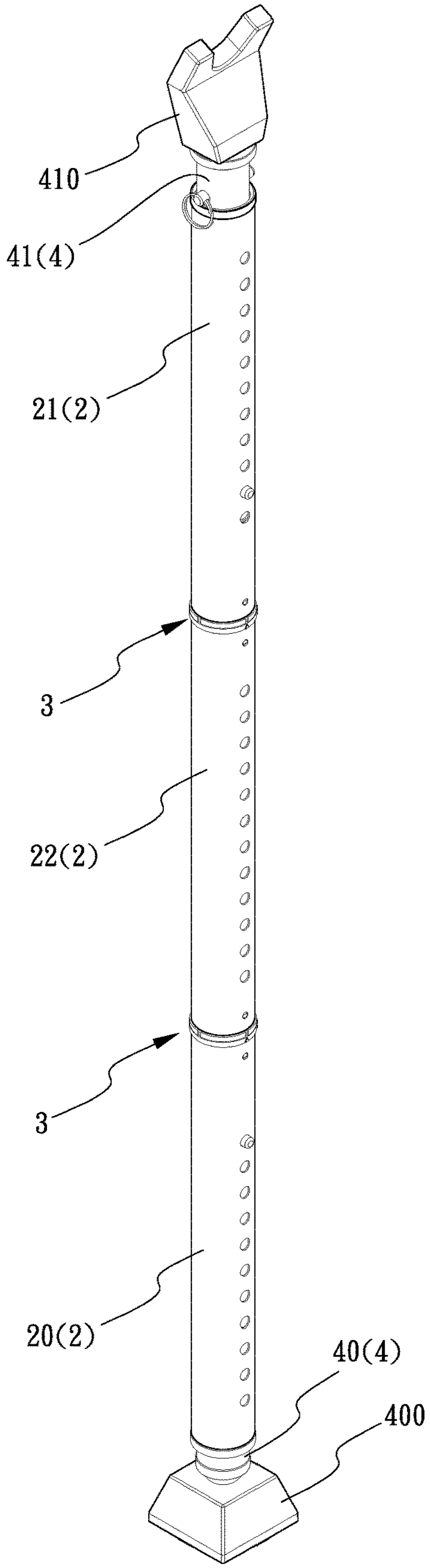
FIG. 9 shows a second embodiment of the telescopic door stop device of the present invention.

It is noted that the structure of the door "T1" of different brands is different, and the distance between the door handle "T" and the ground "G" also varies. Through the above explanation, it is evident that the door stop device 1 of the present invention has a modular design rather than an integrated rod body structure. Therefore, when disassembling the first tube 20 and the second tube 21 of the door stop device 1, both are rotated simultaneously in opposite directions (in this embodiment, the first door tube 20 rotates counterclockwise while the second tube 21 rotates clockwise). This causes the engaging part 301 of the first connecting member 30 to rotate from the position in the rotational groove 318 of the second connecting member 31 to the position in the engaging groove 313, freeing the second segment 304 of the engaging part 301 from the locking relationship with the second stop portion 315 of the plate 312. Once the positional relationship between the first connecting member 30 and the second connecting member 31 is released, the first tube 20 and the second tube 21 can be disassembled. Additionally, users can add a third tube 22 between the first tube 20 and the second tube 21 (as shown in FIG. 9) according to their actual needs, increasing the overall length of the tube assembly 2. The assembly and disassembly method between the third tube 22 and the first tube 20 and the second tube 21 is the same as described above.

Figure 10:
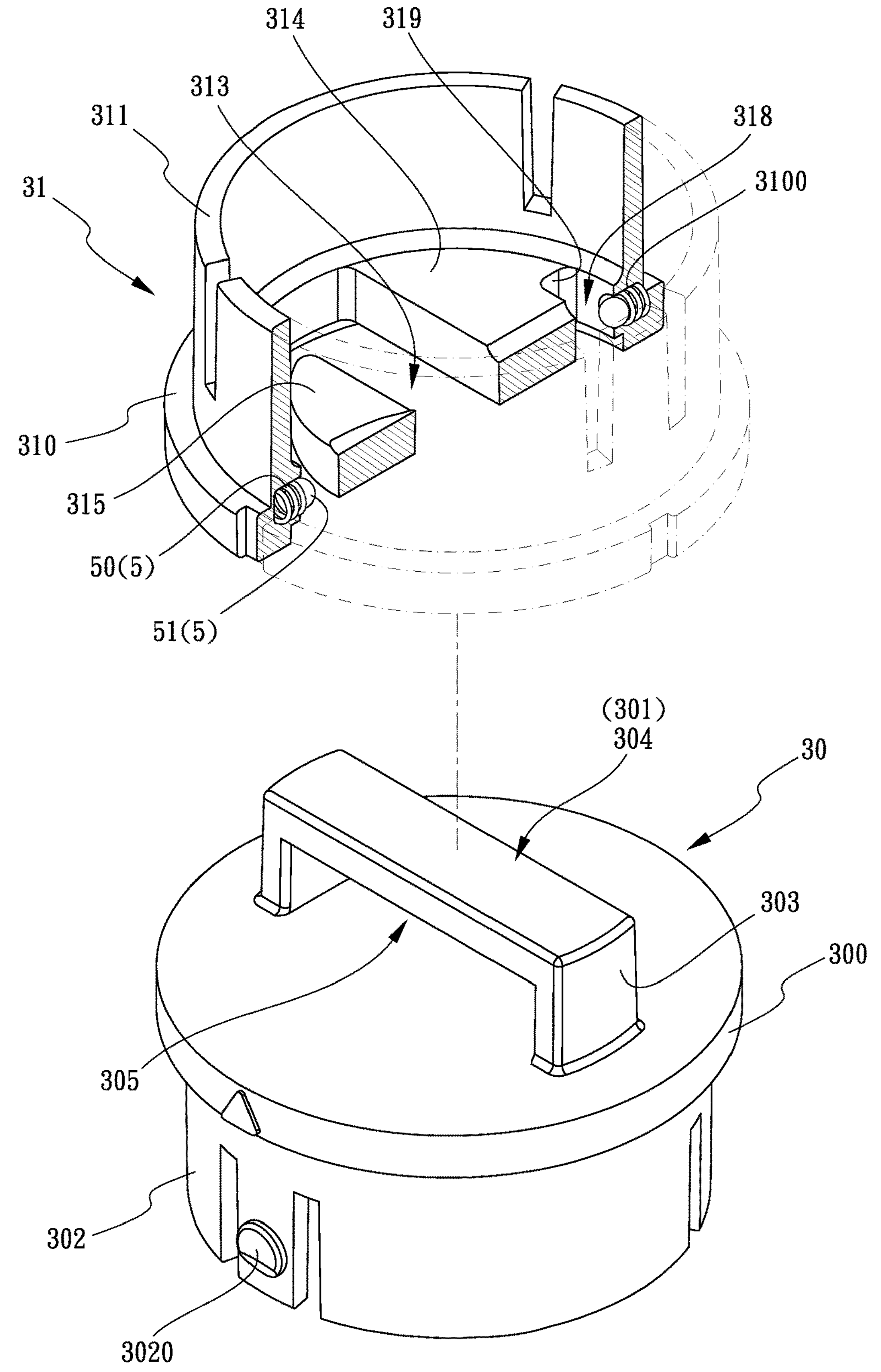
FIG. 10 shows the first connecting member and the second connecting member of the second embodiment of the telescopic door stop device of the present invention.
Figure 11:
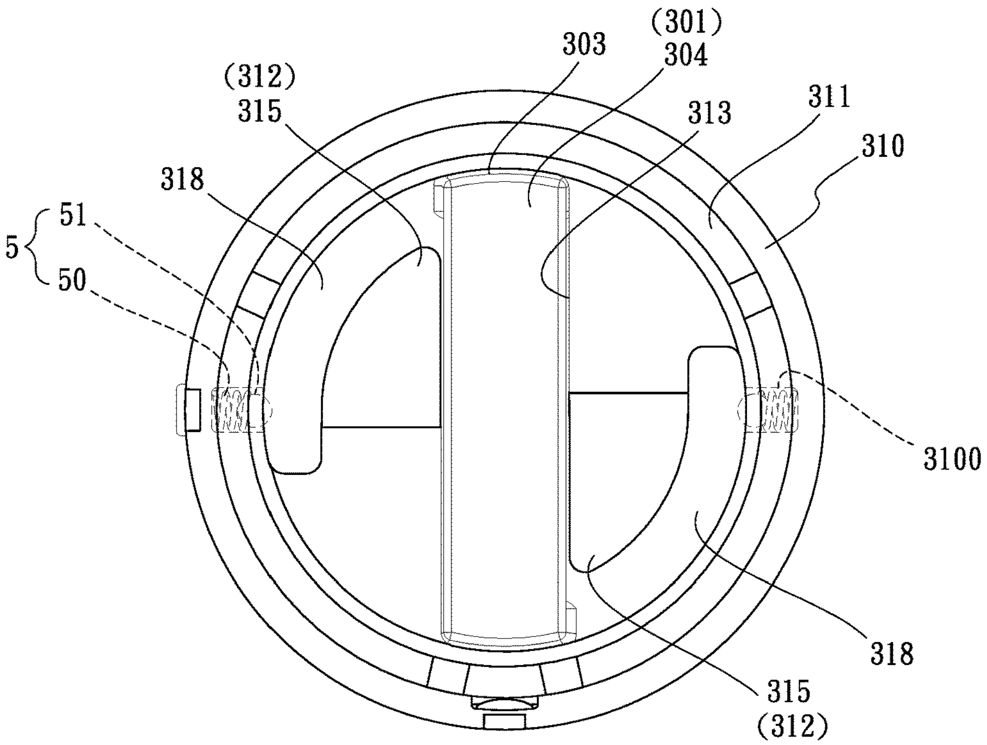
FIG. 11 shows that the engaging part of the first connecting member is located in the engaging groove of the second connecting member of the second embodiment, the first connecting member has not rotated relative to the second connecting member.
Figure 12:
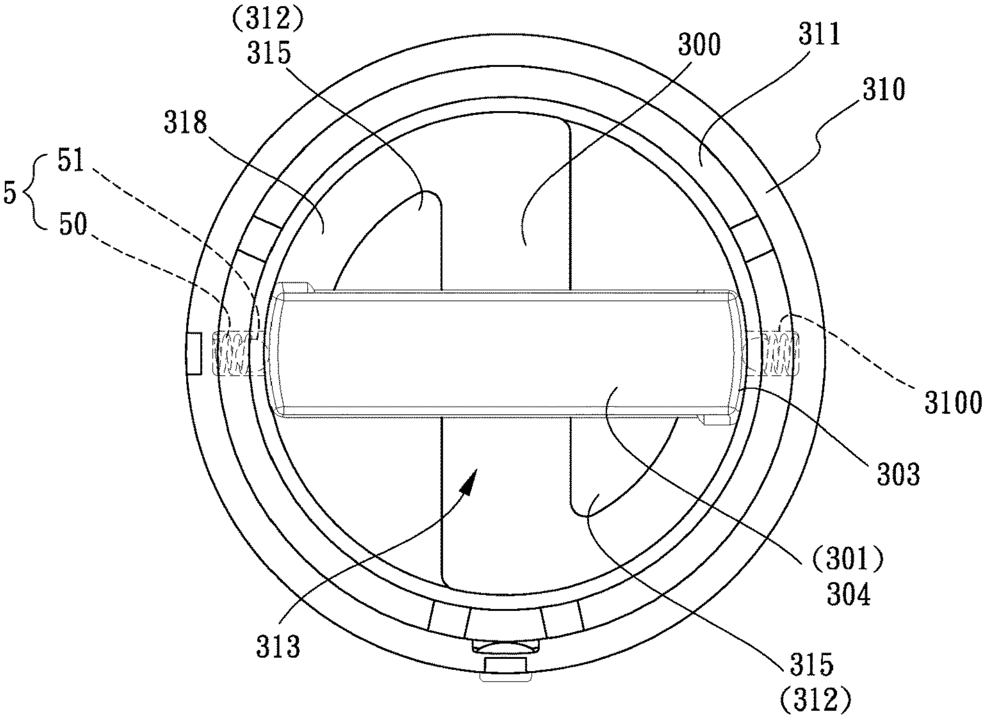
FIG. 12 shows that the engaging part of the first connecting member of the second embodiment is rotated to connect the first connecting member to the second connecting member.

In addition, an inner wall surface of the second connecting member 31 has an elastic urging assembly 5 positioned relative to the rotational groove 318 and close to the closed end 319. The elastic urging assembly 5 contacts against an outer surface of the second segments 303 of the engaging part 301 to connect the first connecting member 30 to the second connecting member 31. The elastic urging assembly 5 comprises an elastic member 50 and an end member 51. The inner wall surface of the second connecting member 31 includes a receiving groove 3100, the elastic member 50 is received in the receiving groove 3100, and the end clamping member 51 partially protrudes from the rotational groove 318 as shown in FIG. 10. When the engaging part 301 of the first connecting member 30 rotates from the position in the engaging groove 313 to the position in the rotational groove 318, the outer surface of the first segment 303 of the engaging part 301 and the end member 51 of the elastic urging assembly 5 mutually tighten against each other (as shown in FIG. 12). In other words, the elastic urging assembly 5 enhances the tight interlocking relationship between the first connecting member 30 and the second connecting member 31.

While we have shown and described the embodiment in accordance with the present invention, it should be clear to those skilled in the art that further embodiments may be made without departing from the scope of the present invention.

What is claimed is:

1. A door stop device (1) with a rotary connection, the door stop device comprising:

a tube assembly (2) comprising a first tube (20) and a second tube (21);

a connecting tube assembly (3) including a first connecting member (30) detachably connected to the first tube (20), and a second connecting member (31) detachably connected to the second tube (21), the first connecting member (30) detachably connected to the second connecting member (31), the first connecting member (30) having an engaging part (301), the second connecting member (31) having an engaging groove (313), two rotational grooves (318) respectively extending from the engaging groove (313), when the engaging part (301) is inserted into the engaging groove (313) and rotated into the rotational grooves (318), the first connecting member (30) and the second connecting member (31) are mutually locked in a non-rotatable position to connected the first tube (20) to the second tube (21), and a stop assembly (4) including a door stop element (410) inserted into the first tube (20), a door supporting element (400) inserted into the second tube (21).

2. The door stop device with a rotary connection as claimed in claim 1, wherein the first tube (20) and the second tube (21) each have corresponding first opening (200) and second opening (210), the first connecting member (30) having a first tubular part (302) located corresponding to the first opening (200) and inserted into the first opening (200), the second connecting member (31) having a second tubular part (311) located corresponding to the second opening (210) and inserted into the second opening (210), the first tubular part (302) includes a first protrusion (3020), the second tubular part (311) includes a second protrusion (3110), the first tube (20) includes a first fixing hole (201) in which the first protrusion (3020) is inserted, the second tube (21) includes a second fixing hole (211) in which the second protrusion (3110) is inserted.

3. The door stop device with a rotary connection as claimed in claim 1, wherein the first tube (20) and the second tube (21) have multiple positioning holes (202, 212) respectively, the door supporting element (400) is connected to a first rod (40) which is inserted into the first tube (20) and located opposite to the first connecting member (30), the door stop element (410) is connected to a second rod (41) which is inserted into the second tube (21) and located opposite to the second connecting member (31), the first rod (40) includes a first positioning part (401) which extends one of the positioning holes (202) of the first tube (20), the second rod (41) includes a second positioning part (411) which extends one of the positioning holes (212) of the second tube (21).

4. The door stop device with a rotary connection as claimed in claim 2, wherein the first connecting member (30) has a first base (300), the second connecting member (31) has a second base (310), the engaging part (301) and the first connecting part (302) of the first connecting member (30) are positioned on two opposite sides of the first base (300), the second tubular part (311) is positioned on an upper side of the second base (310) of the second connecting member (31), the first base (300) and the second base (310) are respectively abutted against the first opening (200) of the first tube (20) and the second opening (210) of the second tube (21).

5. The door stop device with a rotary connection as claimed in claim 4, wherein the engaging part (301) of the first connecting member (30) is U-shaped part on the first base (300), the engaging part (301) includes two first segments (303) and a second segments (304) connecting between the two first segments (303), a space (305) is formed between the engaging part (301) and the first base (300), the second base (310) has two plates (312), the engaging groove (313) is formed between the two plates (312), each of the plates (312) includes a stepped first stop portion (314) and a second stop portion (315), the second stop portion (315) has a linear end surface (316) and a curved end surface (317) corresponding to the rotational groove (318), the rotational groove (318) forms a closed end (319) at its end, and the rotational groove (318) communicates with the engaging groove (313).

6. The door stop device with a rotary connection as claimed in claim 5, wherein a thickness of the second stop portion (315) is less than that of the stepped first stop portion (314), when the first base (300) of the first connecting member (30) and the second base (310) of the second connecting member (31) are engaged with each other, the engaging part (301) of the first connecting member (30) rotates into the rotational groove (318) of the engaging groove (313) of the second connecting member (31) through the rotational space (305), the second segments (304) of the engaging part (301) forms a locking relationship with the second stop portion (315) to position the first connecting member (30) relative to the second connecting member (31).

7. The door stop device with a rotary connection as claimed in claim 5, wherein an inner wall surface of the second connecting member (31) has an elastic urging assembly (5) positioned relative to the rotational groove (318) and close to the closed end (319), the elastic urging assembly (5) contacts against an outer surface of the second segments (303) of the engaging part (301) to connect the first connecting member (30) to the second connecting member (31).

8. The door stop device with a rotary connection as claimed in claim 7, wherein the elastic urging assembly (5) comprises an elastic member (50) and an end member (51), the inner wall surface of the second connecting member (31) includes a receiving groove (3100), the elastic member (50) is received in the receiving groove (3100), the end clamping member (51) partially protrudes from the rotational groove (318).

9. The door stop device with a rotary connection as claimed in claim 1, wherein the tube assembly (2) includes a third tube (22) interconnected between the first tube (20) and the second tube (21).

10. The door stop device with a rotary connection as claimed in claim 1, wherein the first connecting member (30) and the second connecting member (31) each form an integral structure with the first tube (20) and the second tube (21) respectively.

* * * * *